Patented May 4, 1943

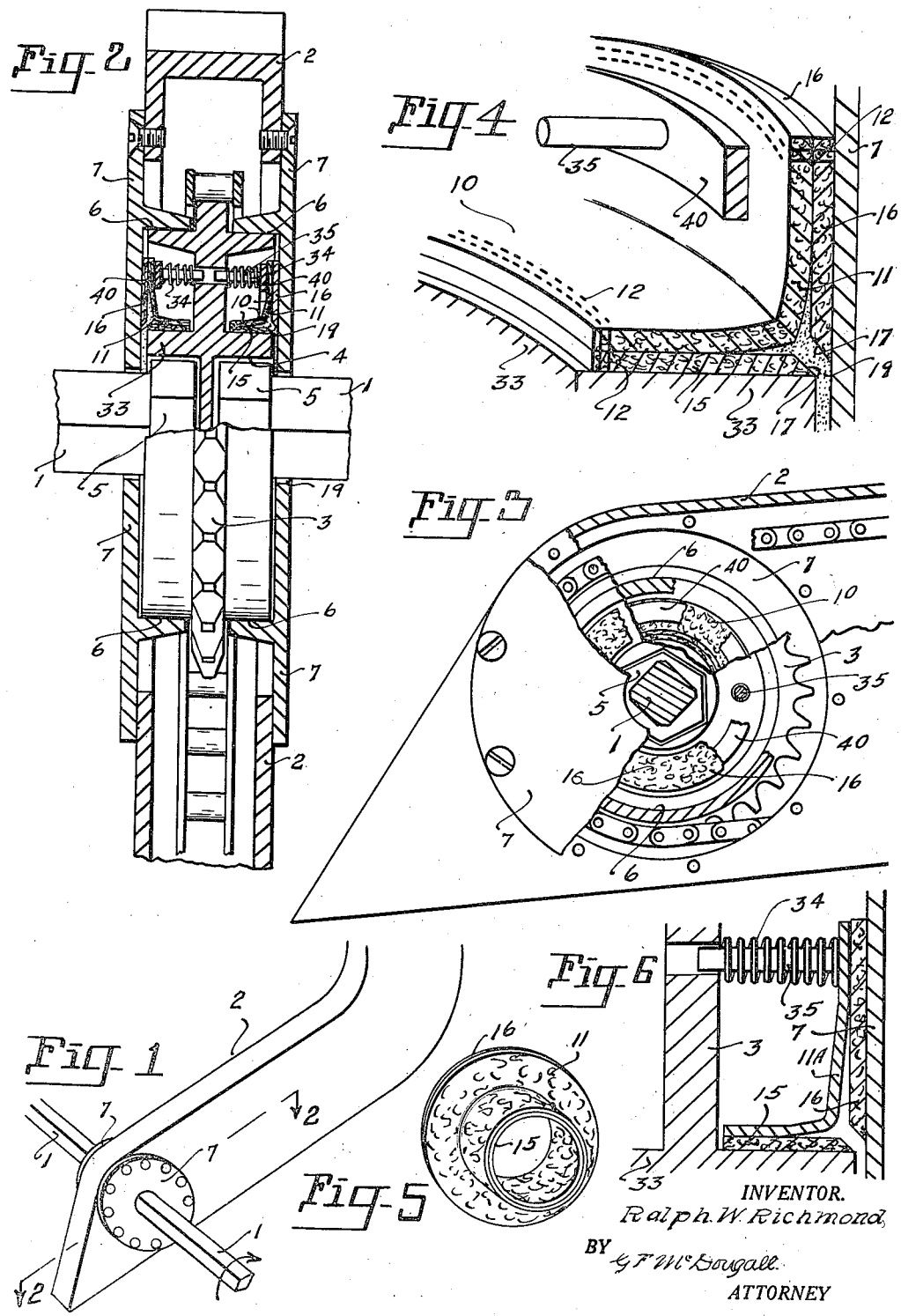

2,318,097

UNITED STATES PATENT OFFICE 2,318,097

DIRTPROOF BEARING

Ralph W. Richmond, Kennewick, Wash.

Application November 3, 1941, Serial No. 417,613

10 Claims. (Cl. 308—36.2)

This invention relates to a dirt-proof bearing for a rotating part in a relatively stationary carrier. More specifically it relates to packing and a mounting therefor capable of excluding dirt when the latter is applied against the bearing with a considerable force and at the same time it is effective to hold oil or semi-fluid grease within the bearing.

The invention is especially useful in protecting the bearings of rod-weeders. Rod-weeders are big business in agriculture and consist essentially of a square rod carried broadside through the soil several inches below its surface, meanwhile rotating slowly in a direction oppositely to ground travel. The rod is supported at frequent length intervals by gooseneck carriers that likewise penetrate the soil and contain bearings for the rod, and there is always some provision for rotating the rod as described. Such bearings have usually been used dry, one patentee saying "it has been found that much dirt will ordinarily enter between the stationary and moving parts and rapidly cut out or choke the bearing."

It is therefore an object of this invention to provide a packing that is effective to keep dirt out as well as to retain lubricant within such a bearing, or in fact any bearing where dirt conditions are extremely severe, such as mine trucks, wheeled tools and vehicles used in excavating and tunnel work and the like. Especially in the rod-weeder is it desirable to have such a bearing to open the door to a centrally located rod drive, instead of the awkward end drive with its tumbling rod and crossed sprocket chain sometimes used.

Two forms of the packing of the invention are shown, but it will be noted that the essential feature is the same in all of them, a pair of lips of leather or an acceptable substitute, so positioned that entering dirt must spread them apart and into firmer contact with their seats, the seat being well lubricated.

In making up this packing structure, I prefer leather as the packing material since it will hold enough lubricant when installed to act efficiently and takes additional quantities by capillary action during use.

A drawing accompanies and forms a part of this specification, in which;

Fig. 1 is a perspective view of the point of a gooseneck, as used in a rod weeder, at a small scale;

Fig. 2 is a section at 2—2, Fig. 1;

Fig. 3 is a side view of the structure of Fig. 2 with parts broken away;

Fig. 4 is a perspective view of the packing shown in section to bring out its novel features;

Fig. 5 is a perspective view of the packing shown in Fig. 4 as it will appear ready to apply to the bearing; and Fig. 6 is an alternate form of construction of the packing but employing the same principle.

In the drawings 1 is the rectangular rod member of a rod-weeder, which by being mounted in a number of goosenecks such as 2 and being given a clockwise rotation indicated by the arrow in Fig. 1, will perform its function in a highly satisfactory manner.

The rod 1 receives its rotary motion by the sprocket 3 which is provided with pockets 4 within which the heads 5 of the rods 1 are mounted. Bearings for the sprocket 3 are shown at 6 and one-half of said bearings is shown to be made integral with the side-plates 7, being in the form of annular flanges. This is an excellent form of bearing.

The rod 1 represents a shaft, pin, axle or any part whatever that requires a bearing to provide that it may turn. The foregoing is one of the few forms that will be found available when it is considered that the bearing must be sealed off, positively, against the entrance of dirt.

It will be noted that there are two dirt seals shown, one on each side as is well seen in Fig. 2, and these seals are given the number 10 which refers to the whole assembly, the details of the seals being given other numbers in Fig. 4.

Fig. 4 shows a section of a seal in which 11 represents a flanged tube type of packing, such as is commonly used for elevator valves, the tube portion being faced on the inner diameter thereof by a well fitted tube 15 that is just small enough to go inside and which in turn has an inner diameter just right to be a snug fit on the outside of the annular flanges 33 of the sprocket 3. Its inner edge will be attached as by stitching or by a copper rivet to the part 11 as shown at the point 12, Fig. 4. The other end will preferably be provided with the well known beveled sealing edge as at 17.

The upstanding annular flange portion of the part 11 will also be provided with a renewable seal portion 16, likewise provided with a beveled sealing edge 17.

To bring out the operation of this seal as a whole, it is shown both in Fig. 2 and Fig. 4 as it would appear after being used for some time. The force tending to make soil enter a bearing in such a situation as shown in Fig. 1 has heretofore been considered insurmountable; hence they are made of hard steel, white iron or such materials, and run unlubricated, which has of course excluded the center drive such as now shown. In this sealed bearing the dirt acts much as hydraulic fluid does when the well known cup-leather is used. Dirt finds its way in under pressure at 19 and spreads the edges or lips 17 apart, and the harder the pressure the better the seal as in hydraulics.

Lateral contact of the part 16 with the part 7 is maintained by the springs 34 mounted on the pins 35, which in turn are engaged with the web of the sprocket 3 as shown in Fig. 2. The friction surface is between the parts 16 and 7 and the open space in the gooseneck used as a spring bearing in the other form will be filled with semi-fluid oil.

For reasons at once apparent, I prefer to use leather for the seal members because oil will keep it soaked clear to the very tip of the seal edge 17, as I think, much better than a substitute; though I do not exclude substitutes if satisfactory ones are to be found.

In Fig. 6 I have shown an alternative construction in which the inner part of the seal member, indicated by numeral 11 in Fig. 4, is substituted for by a metal member indicated by 11a; in which case the plate 40, Fig. 4, will be omitted and the pin 35 attached directly to the part 11a as shown.

Having disclosed my invention in its best form as I now know it and explained the principle and operation thereof, what I claim as new and desire to secure by Letters Patent, is:

1. A hydraulic type packing for a shaft in a bearing defined as a double course tubular portion having a double course annular flange at one end thereof, the said tube and flange being joined together in sealing continuity save that the outside course of the flange portion and the inside course of the tube are adjacent but not touching and have sealing lips formed thereon.

2. A hydraulic type packing member for a shaft supported in a bearing comprising a metal tube, a metal flange made integral with the tube at one end, a tube of flexible material inside the metal tube and sealed thereto at the end opposite the flange, a sealing lip formed on the other end, an annular facing of flexible material on the outside of the flange, with the respective perimeters sealed together and a sealing lip formed on the inside diameter of the facing, the said sealing lips so formed that they are adjacent but not touching.

3. A dirt proof bearing for a shaft, comprising a bearing, a shaft in the bearing, a housing, end plates for the housing provided with shaft openings through which the shaft extends, a dirt seal for the shaft and end plate comprising a flexible tube surrounding the shaft with a sealing lip thereon adjacent the end plate, an annular flexible member with a sealing lip adjacent the end of the tube and a flanged covering tube for the first named tube, the said tubes being joined dirt tight at their inside ends and the annular flexible member being joined to the flange portion near its perimeter.

4. A dirt proof bearing assembly for a shaft comprising a shaft bearing, a housing therefor, end plates for the housing provided with shaft openings, a shaft in the bearing that extends through the openings, and double course flanged tubular packing member mounted over the shaft inside the housing with the flange portion thereof bearing against the end plate, characterized by the inside of the tube and the corresponding portion of the flange being discontinuous and having sealing lips formed thereon adapted to seal against the shaft and end plate respectively.

5. A shaft bearing for a rod weeder adapted to run through soil, comprising a rod carrier, a bearing within the carrier, a housing over the bearing, end plates on the housing provided with rod openings in alignment, a rod carrier and a dirt seal between the carrier and the end plates comprising a double tube packing member with a double flange, one end positioned so that the tube covers the carrier and the flange bears against the end plate, the said tube and flange being discontinuous as to covering and bearing courses respectively and provided with sealing lips that tend to spread apart upon the entrance of soil therebetween to increase the sealing effect.

6. A packing member for a housing provided with a shaft opening with a shaft extending through the opening, comprising a double course tubular packing member with a double course flange portion on one end, the said packing member being adapted to overlay the shaft and bear with its flange against the inside of the housing, characterized by the course next adjacent the shaft opening being discontinuous with respect to the flange, with adjacent sealing lips on tube and flange adapted to spread apart under influence of dirt entering between the shaft and the opening.

7. A packing member adapted to seal a shaft opening through a plate having a shaft extending therethrough, comprising a double course tubular portion adapted to fit closely around an offset portion of the shaft, and a double course flange portion made continuous as to the outside course of the tube and the inside course of the flange and divided as to the other courses between the tube end and flange, with sealing lips formed on the respective divisional boundaries, said packing adapted to be supported so that the sealing lips tend to spread upon entrance of dirt between the shaft and the opening.

8. A rod drive assembly for driving a rod underground comprising a gooseneck member, a housing near the point thereof comprising two side-plates with shaft openings therethrough, a driven sprocket revolubly mounted between the side-plates, a shaft extending through the openings and revolubly connected with said sprocket, and a pair of dirt seals each comprising a double course tubular portion with a doubled flange made rigid therewith, said packing being mounted to revolve with the shaft and sprocket and provided with a pair of sealing lips made by separating the inner tube portion from the outer flange portion, said lips being so formed that dirt entering the housing passes between the lips and tends to spread them apart into more effective sealing relationship to the inside of the housing.

9. A dirt-proof packing assembly for a housing having a shaft opening and a shaft extending outwardly therefrom comprising a housing, a bearing therein, a shaft revolubly mounted with respect to the bearing, a shaft carried within the housing and revoluble therewith, a double course flanged packing member mounted with its tubular portion on the carrier and its flange in contact with the inside surface of the housing, that portion of the double course packing next adjacent the opening through which the shaft extends divided on a circular line with sealing lips formed on both parts that are adjacent but not touching, and so positioned with respect to the housing and the bearing that they tend to intercept and trap entering dirt.

10. A hydraulic type flexible packing comprising a tubular member having a sealing lip on one end thereof, an annular member having a sealing lip on the inside boundary of the annulus, both lips effective to seal at the same time under pressure entering between them and means for holding the members so that the respective lips are adjacent but not touching, said means also effective to limit the volume of material that can enter between the lips.

RALPH W. RICHMOND.